(12) United States Patent
Friedman et al.

(10) Patent No.: US 9,349,115 B2
(45) Date of Patent: May 24, 2016

(54) DATA MANAGEMENT AND CONTROL USING DATA IMPORTANCE LEVELS

(75) Inventors: Joanne Friedman, Efrat (IL); Shira Gellman, Jerusalem (IL); Marc N. Haber, Efrat (IL); Benjamin Halberstadt, Jerusalem (IL); Ruthie M. Amaru, Alon Shvut (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/004,353

(22) Filed: Jan. 11, 2011

(65) Prior Publication Data

US 2012/0179675 A1 Jul. 12, 2012

(51) Int. Cl.
*G06F 17/00* (2006.01)
*G06Q 10/10* (2012.01)
*G06F 7/00* (2006.01)
*G06F 17/30* (2006.01)

(52) U.S. Cl.
CPC .......... *G06Q 10/10* (2013.01); *G06F 17/30563* (2013.01); *G06F 17/30702* (2013.01)

(58) Field of Classification Search
None
See application file for complete search history.

(56) References Cited

U.S. PATENT DOCUMENTS

| | | | | |
|---|---|---|---|---|
| 5,774,887 | A * | 6/1998 | Wolff et al. | |
| 6,016,482 | A * | 1/2000 | Molinari et al. | 705/35 |
| 8,099,341 | B2 * | 1/2012 | Varghese | 705/30 |
| 8,621,382 | B1 * | 12/2013 | Young et al. | 715/780 |
| 2003/0055815 | A1 | 3/2003 | Chender et al. | |
| 2003/0193960 | A1 * | 10/2003 | Land | 370/401 |
| 2006/0085434 | A1 | 4/2006 | Mah et al. | |
| 2006/0095466 | A1 * | 5/2006 | Stevens et al. | 707/103 R |
| 2006/0136330 | A1 * | 6/2006 | DeRoy et al. | 705/38 |
| 2006/0282354 | A1 * | 12/2006 | Varghese | 705/32 |
| 2007/0078831 | A1 | 4/2007 | Relvas | |
| 2007/0203939 | A1 | 8/2007 | McArdle | |
| 2008/0120346 | A1 | 5/2008 | Neogi et al. | |
| 2009/0164232 | A1 * | 6/2009 | Chmielewski et al. | 705/1 |
| 2009/0172006 | A1 * | 7/2009 | Ducaule et al. | 707/102 |
| 2009/0175532 | A1 * | 7/2009 | Zuev et al. | 382/159 |
| 2010/0030803 | A1 | 2/2010 | Rothenberg et al. | |
| 2011/0214067 | A1 * | 9/2011 | Tanaka | 715/745 |

\* cited by examiner

*Primary Examiner* — Usmaan Saeed
*Assistant Examiner* — Yu Zhao
(74) *Attorney, Agent, or Firm* — Susan Murray; SVL IPLaw Edell, Shapiro & Finnan, LLC

(57) ABSTRACT

Data management and control, including obtaining an importance level associated with a data item, identifying a data entry interface as a source of the data item, associating the importance level with the data entry interface, and performing an action corresponding to the association of the importance level with the data entry interface.

22 Claims, 8 Drawing Sheets

300

| Consl ID | 123456789 | | Address | 12 Main St |
| --- | --- | --- | --- | --- |
| Addressee | Mr. John Smith | | | |
| Title | Mr. Smith | | City | NY |
| | | | State | NY |
| | | | Postal code | 98765 |
| | | | Country | USA |

| Call Date | 22/03/00 | Caller | Adrian Beney |
| --- | --- | --- | --- |
| Response Code | SB | EMPLOYMENT INFORMATION | |
| Total Loan Amount | $100,000 | Employer | — 302 |
| Monthly Payment | $2000 | Job Title | — 304 |
| Years | 8 | Total Net Salary | $45,000 — 306 |
| | | Total Gross Salary | $85,000 |

OTHER OUTSTANDING LOANS

| Total Outstanding Loans | $20,000 — 308 |
| --- | --- |
| Monthly Payment | $1000 — 310 |

| Refusal Reason | |
| --- | --- |
| Refusal "Other" | |

| | | | |
|---|---|---|---|
| Consl ID | 123456789 | Address | 12 Main St |
| Addressee | Mr. John Smith | City | |
| Title | Mr. Smith | | NY |
| | | State | NY |
| | | Postal code | 98765 |
| | | Country | USA |

| | | | | |
|---|---|---|---|---|
| Call Date | 22/03/00 | Caller | Adrian Beney | |
| Response Code | SB | EMPLOYMENT INFORMATION | | |
| Total Loan Amount | $100,000 | Employer | IBM Inc. | 302 |
| Monthly Payment | $2000 | Job Title | Logistics Support | 304 |
| Years | 8 | Total Net Salary | $43,776 | 306 |
| | | Total Gross Salary | $85,000 | |

OTHER OUTSTANDING LOANS

| | | |
|---|---|---|
| Total Outstanding Loans | $25,780 | 308 |
| Monthly Payment | $25,780 | 310 |
| Refusal Reason | | |
| Refusal "Other" | | |

FIG. 3E

DATA MANAGEMENT AND CONTROL USING DATA IMPORTANCE LEVELS

FIELD OF THE INVENTION

The present invention relates to computer-based data entry and reporting systems in general, and more particularly to data management and control.

BACKGROUND OF THE INVENTION

Large business enterprises typically use a variety of independent computer-based software applications to capture and store business information. Data warehousing applications are often used to consolidate information from such applications to generate a variety of reports, typically referred to as Business Intelligence (BI) reports, that are reviewed by management. Often, such as when reviewing a BI report, a manager may recognize that some types of data have become more important to the enterprise than they may have been previously, and that greater care needs to be taken when their underlying data are captured by personnel when using relevant applications.

SUMMARY OF THE INVENTION

Method, system and computer program product embodiments for data management and control are provided, including obtaining an importance level associated with a data item, identifying a data entry interface as a source of the data item, associating the importance level with the data entry interface, and performing an action corresponding to the association of the importance level with the data entry interface.

BRIEF DESCRIPTION OF THE DRAWINGS

The invention will be understood and appreciated more fully from the following detailed description taken in conjunction with the appended drawings in which:

FIGS. 3A-3E, are simplified conceptual illustrations of exemplary results of an implementation of the method of FIG. 2.

DETAILED DESCRIPTION OF THE INVENTION

Figure 1:
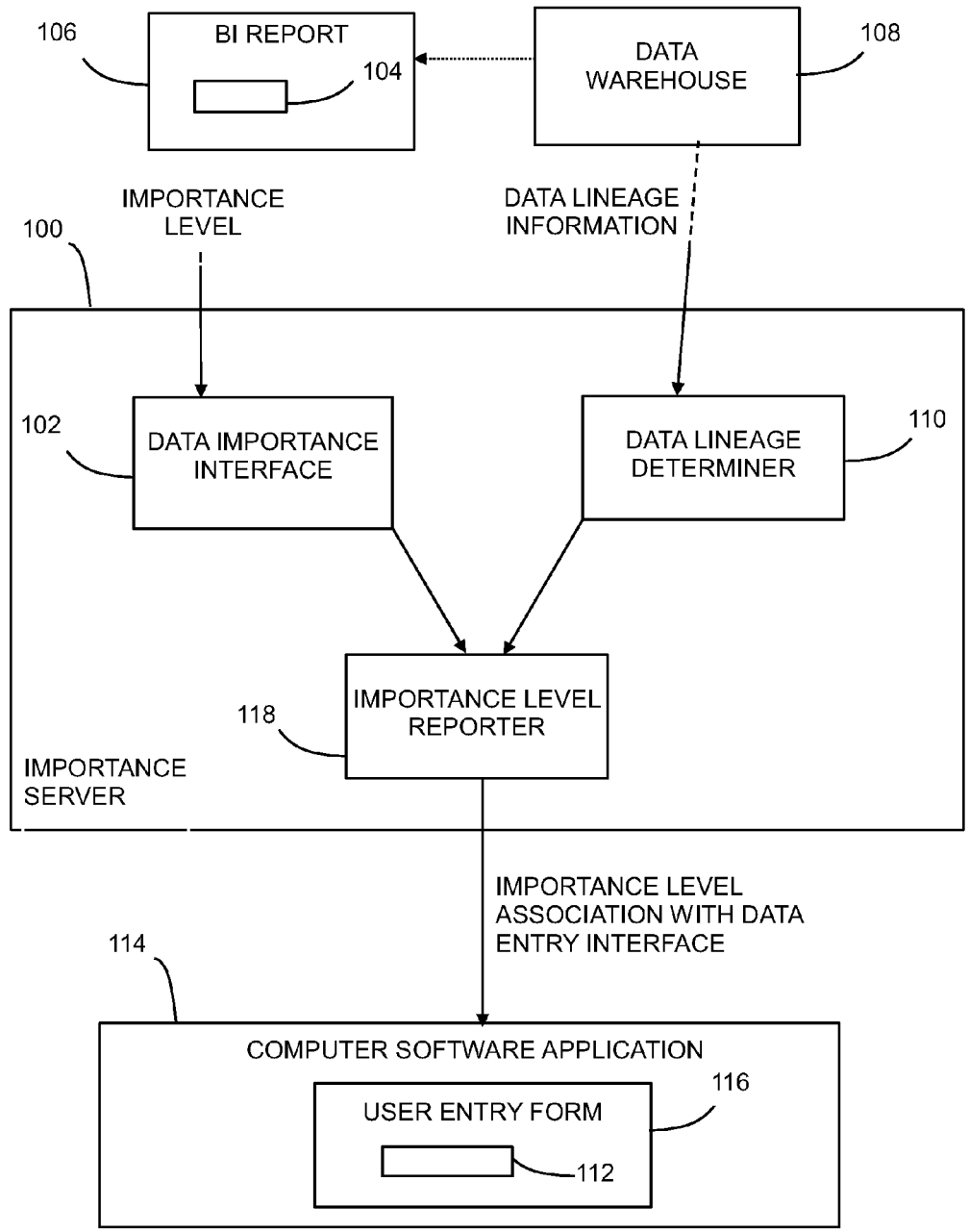
FIG. 1 is a simplified conceptual illustration of a system for data management and control, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a simplified conceptual illustration of a system for data management and control, constructed and operative in accordance with an embodiment of the invention. In the system of FIG. 1, an importance server 100 is preferably configured to receive an indication of an importance level, such as via user input at a data importance interface 102, where the importance level is associated with a data item 104, such as a data item that appears in a business intelligence (BI) report 106 that is generated by a data warehouse application 108. Importance server 100 preferably includes a data lineage determiner 110 that is configured to determine the data lineage of data item 104 and identify a data entry interface 112 of a computer software application 114 that is a source of data item 104. Data lineage determiner 110 preferably determines the data lineage of data item 104 by performing a data lineage analysis of data item 104 using conventional techniques, or by receiving the data lineage information of data item 104, such as from data warehouse 108. Data entry interface 112 may, for example, be a data entry field of a data entry form 116 that is presented to a user by computer software application 114. Alternatively, data entry interface 112 may be any other kind of interface with which a user may interact, such as a button or check box.

Importance server 100 preferably includes an importance level reporter 118 that is configured to associate the importance level with data interface 112 and make the association available to computer software application 114. For example, importance level reporter 118 may set an indicator that computer software application 114 is configured to access, where the indicator indicates the association of the importance level with data entry interface 112. Alternatively, importance level reporter 118 may notify computer software application 114 of the association of the importance level with data entry interface 112 using any known notification technique, where computer software application 114 is configured to receive such notifications. Computer software application 114, or alternatively importance level reporter 118 itself, is preferably configured to perform an action corresponding to the association of the importance level with data entry interface 112, such as representing the association of the importance level with data entry interface 112 in a predefined manner via a computer-controlled output device. This may, for example, include highlighting or otherwise emphasizing the display of data entry interface 112 on a computer display, such as by using a visual indication or displaying a message that draws attention to data entry interface 112, and/or providing an aural indication via computer speakers, such as a recorded or voice-synthesized message that draws attention to data entry interface 112.

Figure 2:
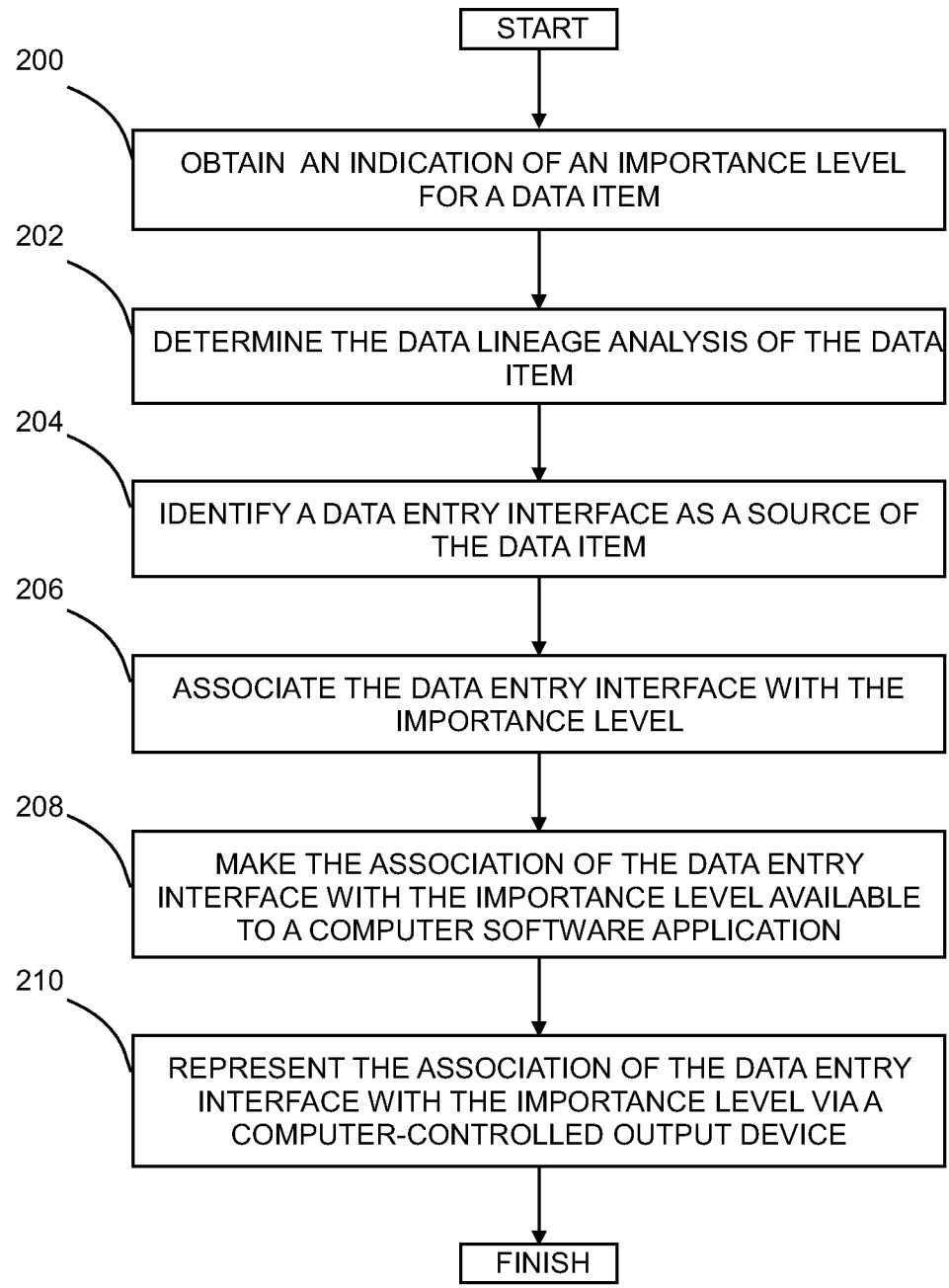
FIG. 2 is a simplified flowchart illustration of an exemplary method of operation of the system of FIG. 1, operative in accordance with an embodiment of the invention.

Reference is now made to FIG. 2, which is a flowchart illustration of an exemplary method of operation of the system of FIG. 1, operative in accordance with an embodiment of the invention. In the method of FIG. 2, an indication of an importance level associated with a data item is obtained (step 200). The data lineage of the data item is determined (step 202), and a data entry interface of a computer software application is identified as a source of the data item (step 204). The importance level is associated with the data entry interface (step 206), and this association is made available to the computer software application (step 208). An action corresponding to the association of the data entry interface with the importance level is performed, such as by representing the association of the importance level with the data entry interface in a predefined manner via a computer controlled output device (step 210).

It is appreciated that the system of FIG. 1 and method of FIG. 2 may receive the importance level associated with a data item, associate the importance level with a data entry interface of a computer software application, and make the importance level known to the computer software application as described above, when the importance level is first associated with the data item, and/or in response to a request being made by the computer software application or a user thereof to determine whether an importance level has been associated with any data item that derives data directly or indirectly from the data entry interface or any other data entry interface of the computer software application.

Figure 3B:
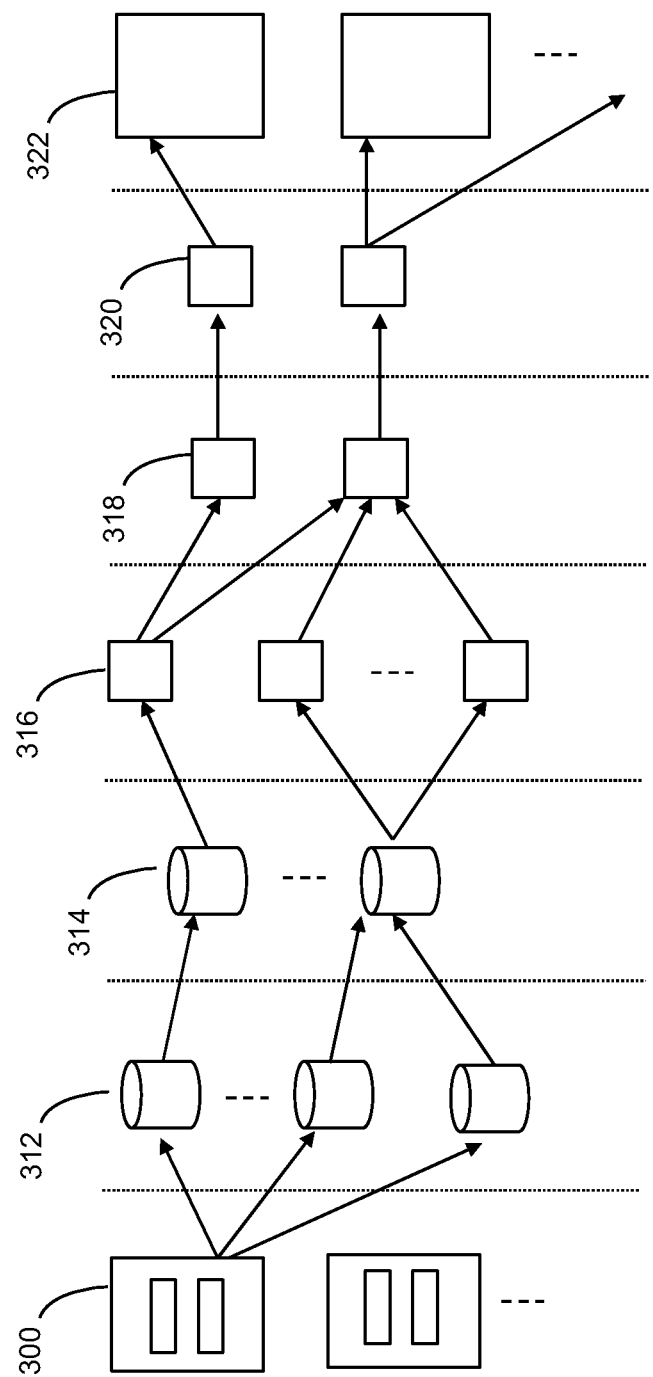

Reference is now made to FIGS. 3A-3E, which, taken together, illustrate a simplified operational scenario of an exemplary implementation of the system of FIG. 1 and method of FIG. 2. FIG. 3A shows a computer-based data entry form 300 of a computer software application for entering data for a mortgage application, where the data entry fields of FIG. 3A are displayed uniformly, with no indication that extra care is required when entering data into a specific field. In FIG. 3A employment information was not entered into fields 302 and 304. Additionally, although the borrower's net salary was entered into field 306, and information relating to other outstanding loans was entered into fields 308 and 310, these figures were entered as rough approximations.

FIG. 3B illustrates that data entered into data entry form 300 are stored in one or more databases 312 that feed one or more databases 314. One or more Extract, Transform, and Load (ETL) jobs 316 are employed to draw data from databases 314 to a data warehouse 318. The data in data warehouse 318 are analyzed, such as in accordance with an Online Analytical Processing (OLAP) Model 320, to generate a BI report 322.

Figure 3C:
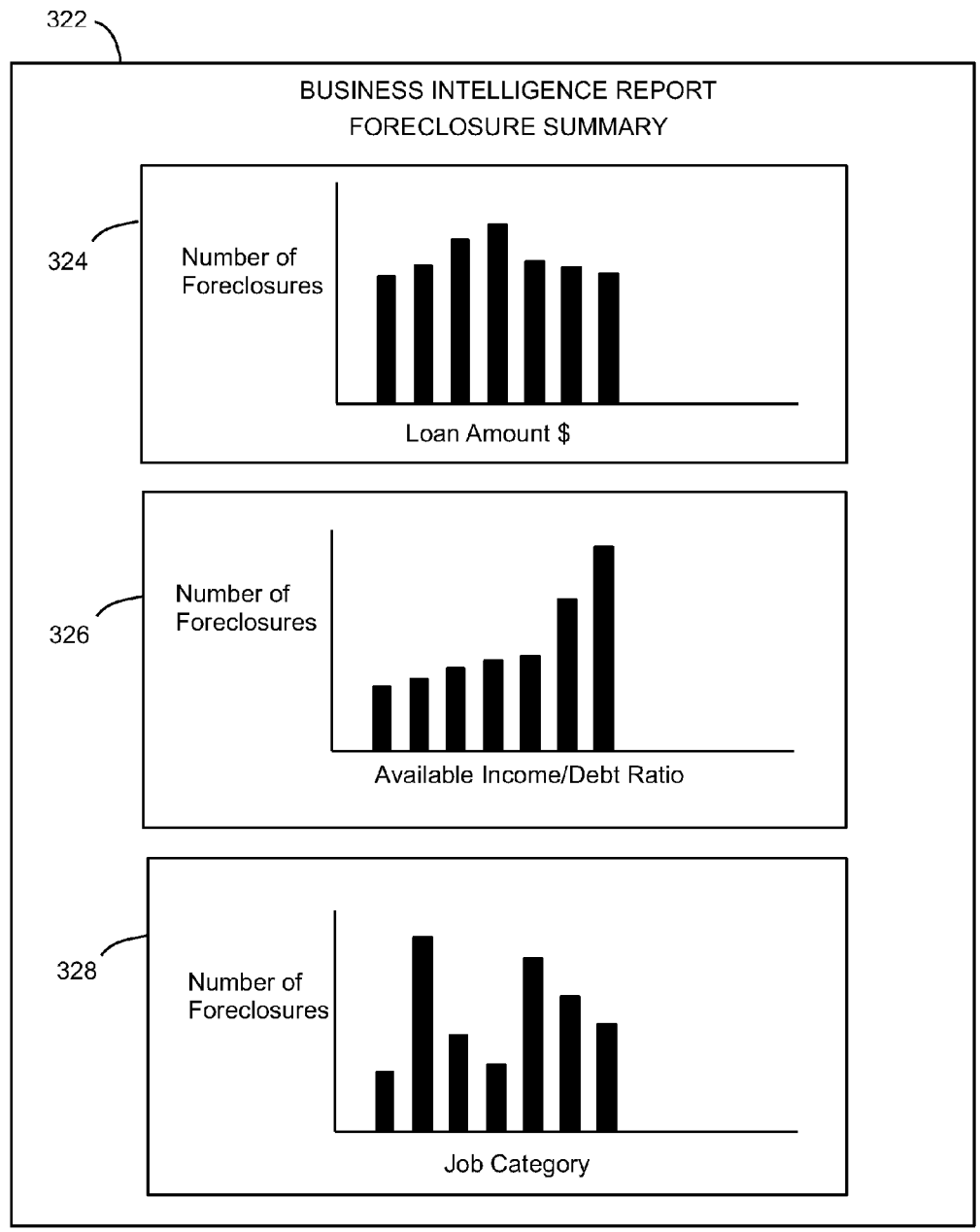

FIG. 3C shows BI report 322 in greater detail, where BI report 322 includes charts 324, 326, and 328. Chart 324 shows foreclosure frequency with respect to the size of the loan, chart 326 shows foreclosure frequency with respect to the ratio between the borrower's available income and the size of the loan, and chart 328 shows foreclosure frequency with respect to the type of job the borrower holds, such as the job sector and job position of the borrower. Upon studying the BI report, an analyst may conclude that since the variance of chart 324 is small, the size of the loan does not have a significant influence on the risk of foreclosure. However, chart 326 shows a clear trend that above a particular threshold of available income to debt ratio, the number of foreclosures rises sharply, leading the analyst to conclude that this ratio is significant in predicting a borrower's risk of foreclosure. Additionally, chart 328 shows a wide range between the job category and the number of foreclosures, leading the analyst to conclude that job category of the borrower may be a strong predictor for the risk of foreclosure as well. The analyst assigns a high level of importance to BI report charts 326 and 328, such as by clicking on each chart and entering a numeric value representing the importance level that is to be associated with the data that are used to build the chart.

Figure 3D:
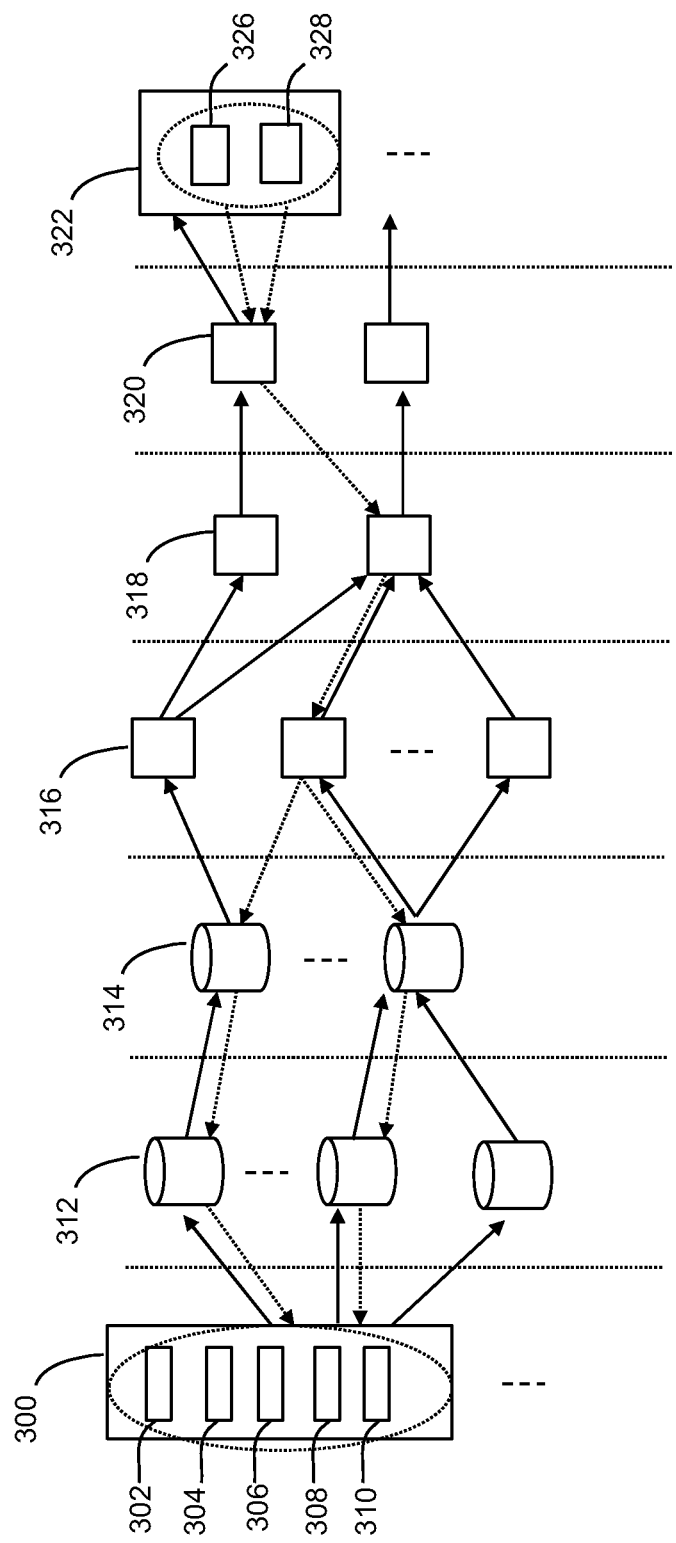

FIG. 3D shows the results of a data lineage analysis of charts 326 and 328 of BI report 322, such as may be performed using conventional methods, such as by using IBM InfoSphere Metadata Workbench. (IBM, and InfoSphere are trademarks or registered trademarks of International Business Machines Corp., registered in many jurisdictions worldwide.) In FIG. 3D, dashed arrows represent paths of data flow from data that were used to build charts 326 and 328 to data entry fields 302, 304, 306, 308, and 310 of data entry form 300.

FIG. 3E shows data entry form 300 after charts 326 and 328 of BI report 322 have been traced to data entry fields 302, 304, 306, 308, and 310 of data entry form 300, where the importance levels assigned to charts 326 and 328 have been associated with data entry fields 302, 304, 306, 308, and 310 and made available to the computer software application that presents and processes data entry form 300. Having been configured to do so for data entry fields having associated importance levels, the computer software application provides special visual indicators around data entry fields 302, 304, 306, 308, and 310 that are recognized by data entry clerks to indicate that extra care is required when entering information into these fields.

Figure 4:
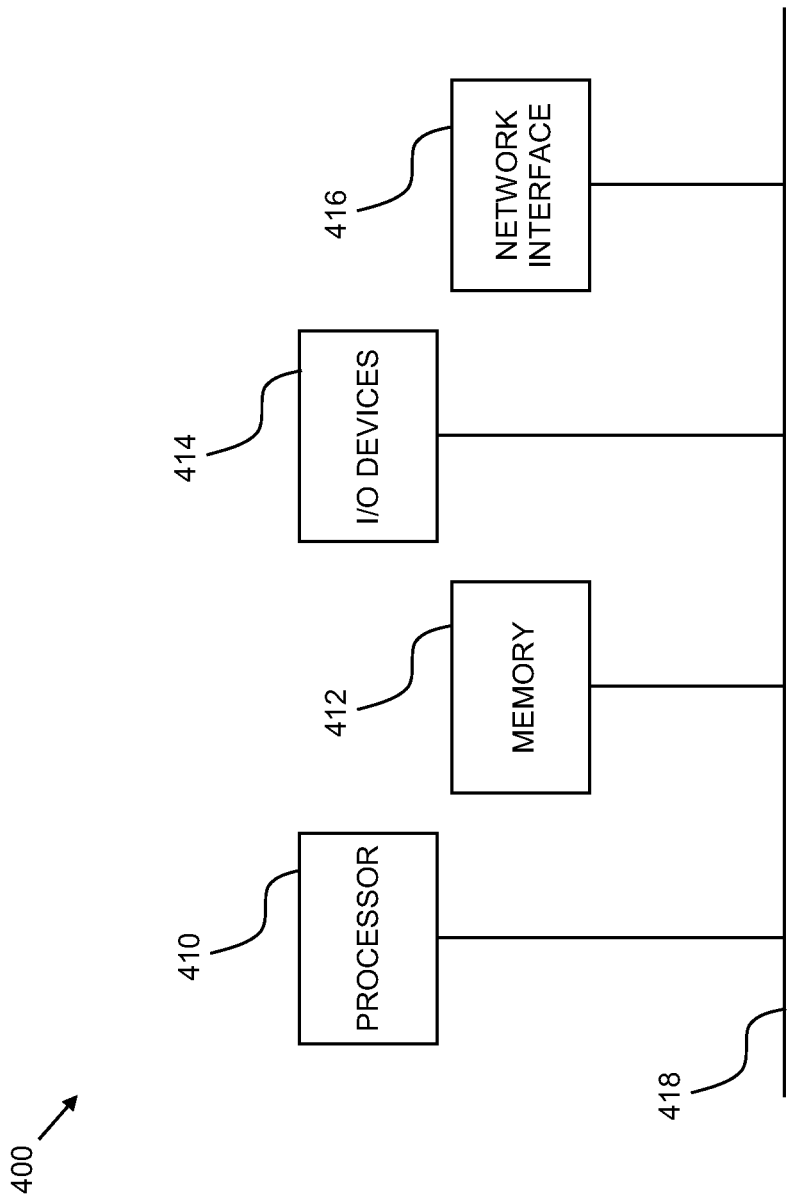
FIG. 4 is a simplified block diagram illustration of an exemplary hardware implementation of a computing system, constructed and operative in accordance with an embodiment of the invention.

Referring now to FIG. 4, block diagram 400 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 410, a memory 412, I/O devices 414, and a network interface 416, coupled via a computer bus 418 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer (not shown).

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for data management and control, the method comprising:

storing a data item in a database previously derived from a data field of a plurality of data fields of a data entry interface;

extracting the data item from the database;

generating a report based on the data item, wherein the data field of the plurality of data fields of the data entry interface from which the data item was derived is not known;

obtaining a newly determined importance level associated with the data item based on the content of the derived data item and the report;

identifying the data field as a source of the derived data item in response to a data lineage analysis tracing the path of the data item from the database to the data field of the data entry interface, wherein the data field is identified from a plurality of data entry interfaces and from the plurality of data fields;

associating the importance level with the data field of the data entry interface in response to the data lineage analysis; and in response to the data lineage analysis, modifying the data entry interface to visually associate the importance level with the data field and visually distinguish the data field from the plurality of data fields.

2. The method according to claim 1 wherein the identifying step comprises performing the data lineage analysis of the derived data item.

3. The method according to claim 1 wherein the identifying step comprises receiving the data lineage of the derived data item.

4. The method according to claim 1 wherein the modifying step comprises representing the association of the importance level with the data field of the data entry interface via a computer-controlled output device.

5. The method according to claim 1 wherein the modifying step comprises making the association of the importance level with the data entry interface known to a computer software application that performs an action corresponding to the association of the importance level with the data field of the data entry interface.

6. The method according to claim 1 wherein any of the steps of obtaining, identifying, associating, and modifying are performed responsive to the importance level being associated with the derived data item.

7. The method according to claim 1 wherein any of the steps of obtaining, identifying, associating, and modifying are performed responsive to a request being made by a computer software application to determine whether an importance level is associated with any data item that derives data directly or indirectly from the data entry interface.

8. A system for data management and control, the system comprising:
a processor including:
a data importance interface to extract a data item from a database, wherein the data item is derived from a data field of a plurality of data fields of a data entry interface, generate a report based on the data item, wherein the data field of the plurality of data fields of the data entry interface from which the data item was derived is not known, and
receive a newly determined indication of an importance level that is associated with the data item based on the contents of the data item and the report;
a data lineage determiner to:
identify the data field as a source of the derived data item in response to a data lineage analysis tracing the lineage of the data item from the database to the data field of the data entry interface, wherein the data field is identified from a plurality of data entry interfaces and from the plurality of data fields, and associate the importance level with the data field of the data entry interface in response to the data lineage analysis; and
an importance level reporter to, in response to the data lineage analysis, modify the data entry interface to visually associate the importance level with the data field and visually distinguish the data field from the plurality of data fields.

9. The system according to claim 8 wherein the data lineage determiner determines the data lineage of the derived data item by performing the data lineage analysis of the derived data item.

10. The system according to claim 8 wherein the data lineage determiner determines the data lineage of the derived data item by receiving the data lineage of the derived data item.

11. The system according to claim 8 wherein the importance level reporter represents the association of the importance level with the data field of the data entry interface via a computer-controlled output device.

12. The system according to claim 8 wherein the importance level reporter makes the association of the importance level with the data field of the data entry interface known to a computer software application that is configured to perform an action corresponding to the association of the importance level with the data field of the data entry interface.

13. The system according to claim 12 and further comprising the computer software application.

14. The system according to claim 8 wherein any of the data importance interface, the data lineage determiner, and the importance level reporter are responsive to the importance level being associated with the derived data item.

15. The system according to claim 8 wherein any of the data importance interface, the data lineage determiner, and the importance level reporter are responsive to a request being made by a computer software application to determine whether an importance level is associated with any data item that derives data directly or indirectly from the data entry interface.

16. A computer program product for data management and control, the computer program product comprising:
a computer-readable storage medium; and
computer-readable program code embodied in the computer-readable storage medium, wherein the computer-readable program code comprises instructions to:
extract a data item from a database, wherein the data item is derived from a data field of a plurality of data fields of a data entry interface;
generate a report based on the data item, wherein the data field of the plurality of data fields of the data entry interface from which the data item was derived is not known;
obtain a newly determined importance level associated with the data item based on the contents of the data item and the report,
identify the data field as a source of the derived data item in response to a data lineage analysis tracing the lineage of the data item from the database to the data field of data entry interface, wherein the data field is identified from a plurality of data entry interfaces and from the plurality of data fields,
associate the importance level with the data field of the data entry interface in response to the data lineage analysis, and
in response to the data lineage analysis, modify the data entry interface to visually associate the importance level with the data field and visually distinguish the data field from the plurality of data fields.

17. The computer program product according to claim 16 wherein the computer-readable program code comprises instructions to perform the data lineage analysis of the derived data item.

18. The computer program product according to claim 16 wherein the computer-readable program code comprises instructions to receive the data lineage of the derived data item.

19. The computer program product according to claim 16 wherein the computer-readable program code comprises instructions to represent the association of the importance level with the data field of the data entry interface via a computer-controlled output device.

20. The computer program product according to claim 16 wherein the computer-readable program code comprises instructions to make the association of the importance level with the data field of the data entry interface known to a computer software application that is configured to perform an action corresponding to the association of the importance level with the data field of the data entry interface.

21. The computer program product according to claim 16 wherein the computer-readable program code comprises instructions to be executed responsive to the importance level being associated with the derived data item.

22. The computer program product according to claim 16 wherein the computer-readable program code comprises instructions to be executed responsive to a request being made by a computer software application to determine whether an importance level is associated with any data item that derives data directly or indirectly from the data entry interface.

* * * * *